April 30, 1940.                G. BOTTOS                2,198,717
                       BICYCLE OR EXERCISE MACHINE
                          Filed Aug. 16, 1939          2 Sheets-Sheet 1
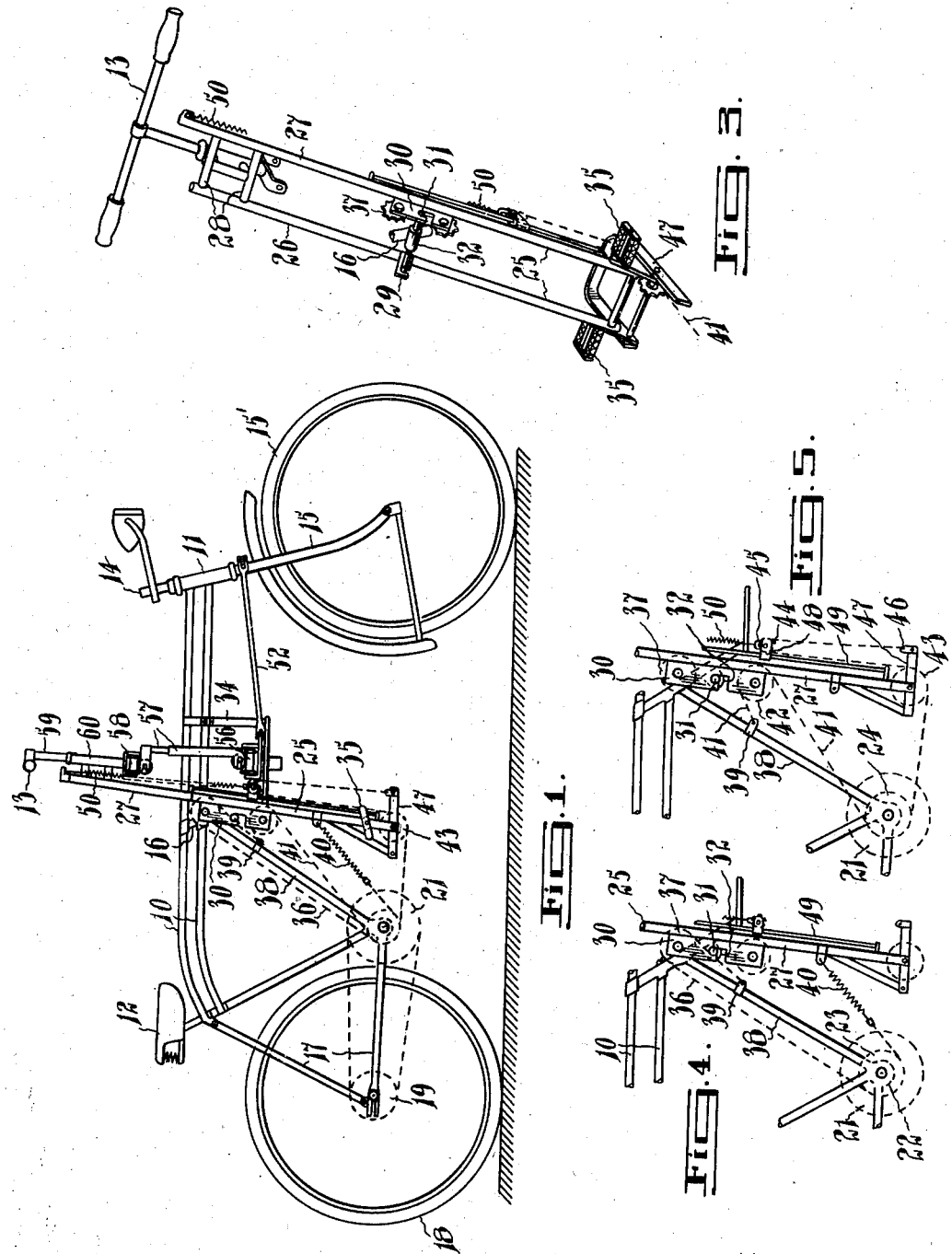
Inventor
Guy Bottos
by Frederick E. Bromley
                    ATTY.

April 30, 1940.    G. BOTTOS    2,198,717
BICYCLE OR EXERCISE MACHINE
Filed Aug. 16, 1939    2 Sheets-Sheet 2
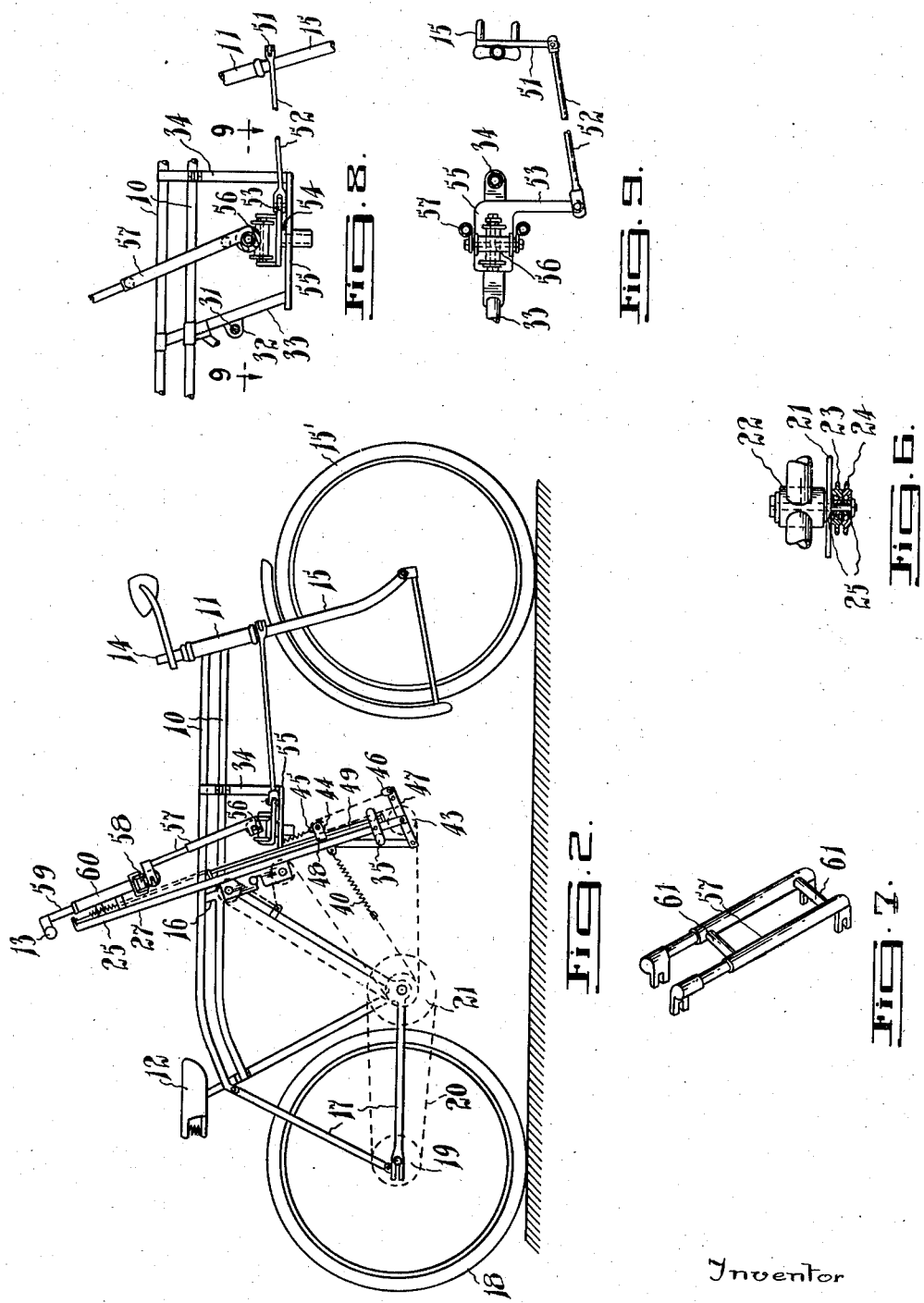
Inventor
Guy Bottos
by Frederick C. Bromley
ATTY Patented Apr. 30, 1940

2,198,717

UNITED STATES PATENT OFFICE 2,198,717

BICYCLE OR EXERCISE MACHINE

Guy Bottos, Mimico, Ontario, Canada

Application August 16, 1939, Serial No. 290,343

10 Claims. (Cl. 280—234)

The object of my invention is to produce a new and useful bicycle operating as an exercise machine by which a person may derive beneficial exercise of the muscles of the body, particularly those of the back, legs and arms, in a pleasant and enjoyable form of diversion attendant upon cycling.

My invention comprehends in its broadest sense a bicycle having a wheeled frame supplied with a seat and carrying a specially designed operating gear in the nature of a walking beam oscillated by the hands and feet of the rider to cause the vehicle to be propelled along. The walking beam element is connected to the traction road wheel by a driving mechanism that converts the to and fro motion into a unidirectional propelling force. Pedals are carried by the walking beam as also is a handle bar which is furnished with a mechanism for steering the front wheel irrespective of the motion or position of the oscillatory device by which locomotion is secured.

My invention furthermore comprises the particular construction and arrangement of the operating gear as detailed in the ensuing description and illustrated in the accompanying drawings.

The invention moreover includes the specific construction of the steering apparatus as herein set forth.

In the drawings, which are illustrative of the preferred embodiment of the invention, there is shown a bicycle in conformity to one built and operated by myself.

Figure 1 is a side elevation of the bicycle with the oscillating mechanism in advance position.

Figure 2 is a similar view but showing the oscillating mechanism in retarded position.

Figure 3 is a perspective detail of the oscillating structure that is operated by conjoint hand and foot pressure.

Figure 4 is a fragmentary detail of the operating gear showing more particularly a chain and sprocket mechanism for operating the traction wheel by the forward stroke of the oscillating mechanism.

Figure 5 is a similar view but showing in particular a chain and sprocket mechanism for operating the traction wheel by the backward stroke of the oscillating mechanism.

Figure 6 is a plan view, partly in section, illustrating sprockets of over-running clutches of the operating mechanism.

Figure 7 is a perspective detail of an extensile element of the steering apparatus.

Figure 8 is a fragmentary detail of the bicycle depicting a hanger that carries the oscillating mechanism and part of the steering apparatus.

Figure 9 is a sectional plan taken on line 9—9 of Figure 8.

Like numerals of reference denote similar parts in each figure of the drawings.

As shown in the drawings, I provide a bicycle frame that is comparative to the conventional frame of an ordinary bicycle with the exception that it is considerably longer. The additional length is necessary by reason of the clearance required for the oscillatory device by which it is operated in place of the usual crank. The increment of length is effected by prolonging the spaced top bars 10 in forward direction so that the steering-post column 11 is positioned well forward of its usual location with respect of the seat 12.

Due to the said extension of this main frame it would not be possible for the rider to reach the handle bar 13 were it mounted directly on the steering post 14 of the fork 15 of the front wheel 15'. Therefore it is, in the present case, located rearwardly of the post 14 so as to be within its usual proximity to the seat, but is carried by the oscillatory means heretofore mentioned. The top bars 10 are suitably reinforced, and the main frame from the point 16 rearwardly of the extension of said top bars is the same in construction as a conventional frame. The rear fork bars 17 attach the traction or drive wheel 18, of which the hub is supplied with the usual sprocket 19 for the chain 20; said drive wheel desirably being a free wheel. That is, the hub has a one-way clutch as customary. Chain 20 is trained around the main sprocket 21 journalled in the crank housing 22, but the usual crank is dispensed with. In its place I substitute a pair of sprockets 23 and 24, one alongside of the other at the outside of the main sprocket 21. Sprockets 23 and 24 are co-axially mounted and have a driving relation with the main sprocket through the intermediary of one-way clutches generally indicated at 25, there being a clutch for each sprocket 23 and 24.

Neither of said clutches 25 is described in detail for the reason that it is of standard construction and is of the type used in the hubs of bicycle wheels to furnish a free-wheel transmission. As a matter of fact the clutch need not be of this type since other known forms of one-way clutches could be utilized in this capacity. Of these two clutches, one is arranged with its driving element connected to sprocket 23 and its driven element connected to the journalled part of the main sprocket 21 so that only forward or clock-wise rotation of sprocket 23 will be communicated to the main sprocket, the clutch overrunning in reverse. The other is similarly arranged and has its driving element connected to sprocket 24 and its driven element connected to that part of the main sprocket which is journalled in the crank housing 22. This clutch likewise only transmits power when the sprocket 24 is rotated forwardly or in clock-wise direction.

Sprockets 23 and 24 are driven intermittently by the oscillating device and serve to alternately drive the main sprocket 21 in a unidirectional manner, which in turn drives the rear wheel 18 by means of the chain 20.

The oscillating device comprises a walking beam or sub-frame generally denoted at 25 and comprised of a pair of spaced bars 26 and 27 extending in an erectile manner and straddling the main frame aforesaid with the upper ends terminating well above the top bars 10. The bars 26 and 27 are formed into a unitary frame by means of suitable crosspieces as at 28, and this framework is suspended by a transverse fulcrum upon the main frame in order that it may be free to oscillate to and fro when operated by the rider.

To suspend the rocker frame 25 I provide the bar 26 with a rigid lug 29 and the bar 27 with a rigid plate 30 opposite thereto. A pivot pin or bolt 31 is transversely inserted in said lug 29 and plate 30 and lodged in a boss 32 rigid with the main frame and disposed between bars 26 and 27. Boss 32 is united to part 33 of a hanger 34 suspended from the top bars 10 aforesaid, which hanger also operates to support part of the extension steering apparatus, as later explained.

This mounting of the rocker frame enables it to oscillate to and fro with respect of the seat but in advance thereof so that a seated person may grasp the handle bar 13 and work the rocker frame with both hands and at the same time steer the vehicle and use the feet conjointly with the hands in the backstroke of oscillation. To enable the feet to be employed in propelling the vehicle the lower end of the rocker frame is supplied with pedals 35 outwardly extending from the bars 26 and 27 and mounted on rigid spindles.

Two chains are used to convert the oscillation of the frame into a continuous forward drive. One of the chains is shown at 36 and is trained around a sprocket 37 journalled upon the rocker frame at a point above the fulcrum on which it swings. The chain is also trained around the sprocket 23 and has its upper end anchored to the bar 38 of the main frame by a clip 39 or the like. The other end is connected by a tension coil spring 40 to the lower end of the rocker frame. This construction is best discernible from an inspection of Figure 4. According to this structure, it will be manifest that as the handle bar is urged forwardly the rocker frame is caused to swing about its fulcrum, the upper part advancing and the lower part receding. This motion or out stroke bodily carries the sprocket 37 through an arc of a circle whose centre is the fulcrum axis of the rocker frame, and since the upper end of the chain 36 is fixed the sprocket 37 is caused to turn and thus feed the chain accordingly. This travel of the chain turns the sprocket 23 forwardly and imparts a driving impulse to the rear wheel 18. The spring 40 accommodates the feeding of the chain.

The oscillation of the rocker frame is completed by pulling backwardly on the handle bar and concurrently pushing forwardly on the pedals. As the upper part of the rocker frame returns the sprocket 23 is declutched from the main sprocket 21, and the spring 40 takes up the return of the chain. The other chain is shown at 41 and is trained around a sprocket 42 journalled upon the rocker frame at a point below the fulcrum 31. This chain extends over the sprocket 24 to a guide pulley 43 and from there it is trained over a pulley 44 of a tightening device 45 and then brought down and anchored at 46 to the lower end of the rocker frame such as by means of the adjustment strap 47. It will be noted that the upper end of this chain is anchored to the main frame in a manner similar to the chain 36 and that the guide pulley 43 is journalled upon the lower end of the rocker frame.

The tightening device 45, of which the pulley 44 is engaged with a loop of the chain, comprises a bracket 48 upon which the pulley 44 is rotatably supported. The bracket is in turn guidably supported for movement lengthwise of the lower extent of the rocker frame, which in the present instance is effected by a slidable connection with a rod 49 attached at its ends to the bar 27. An expansile coil spring 50 applies the required tension on the bracket 48 to maintain the chain taut.

It follows from this construction that coincidentally with the return stroke of the rocker frame the pulley 42 is caused to describe an arc of a circle about the fulcrum 31 and to turn about its axis at the same time, which thus feeds the chain 41 in a direction to forwardly rotate the sprocket 24 that through its clutch turns the main sprocket 21 with it. As the lower part of the rocker frame swings inwardly during the next outward stroke the tightening device 45 under the influence of the spring 50 takes up the slack of chain 41.

It should be clear from the preceding description that the oscillation of the rocker frame effects a continuous drive to the driven road wheel inasmuch as the chains operate alternately to impart a power impulse to the sprockets 23 and 24. Therefore a smooth riding action results and at the same time calling into play the coordination and beneficial exercise of the muscles of the cyclist.

Averting to the steering apparatus, this comprises an arm 51 rigid with the front fork 15 and directed outwardly from one side thereof. One end of a connecting rod 52 is pivoted to the distal end of this arm and the other end is likewise attached to an arm 53 of a stub post 54 vertically journalled in the horizontal plate 55 of the aforedescribed hanger 34 of the main frame. The stub post is attached by a universal joint 56 to an extensile element 57 which in turn is connected by a universal joint 58 to the lower end of the post 59 of the handle bar 13. Post 59 is rigid with the handle bar and turns about its longitudinal axis in the column 60 that is constructed as a rigid and unitary part of the upper end of the rocker frame and disposed slightly in advance of the bars 26 and 27 thereof. The extensile element 57 is composed of a pair of spaced telescopic bars formed as a unit by a crosspiece 61, as detailed in Figure 7. The extensile member and the universal joints function to accommodate positional and angular movement of the rocker frame so that the extension steering apparatus may operate at all times.

The invention is herein disclosed in its preferred construction and it will be manifest to those skilled in the art that various changes and modifications may be resorted to as coming within the spirit and scope of the appended claims.

What I claim is:

1. In a bicycle or exercise machine, a wheeled main frame having a road wheel and a seat, a rocker frame disposed forwardly of said seat and fulcrumed on said main frame for oscillating to and fro, a handle bar carried by the rocker frame above the fulcrum axis thereof, pedals carried by the rocker frame below said fulcrum axis, a rotary driving member mounted on the main frame, a pair of one-way clutches coaxially mounted thereon and adapted to form a forward driving connection therefor, rotary elements carried by the driving parts of said clutches, flexible elements connected to the rocker frame apart from the fulcrum axis thereof and extending respectively around the said rotary elements of the clutches whereby the rocker frame exerts a pull upon the flexible elements to turn the rotary elements, said flexible elements being arranged so that in the oscillation of the rocker frame the forward stroke imparts a forward drive to one of the rotary elements and the back stroke similarly operates the other rotary element, and a power transmitting device connecting said rotary driving member to the aforesaid road wheel.

2. In a bicycle or exercise machine, a wheeled main frame having a road wheel and a seat, a rocker frame disposed forwardly of said seat and fulcrumed on said main frame for oscillating to and fro, a handle bar carried by the rocker frame above the fulcrum axis thereof, pedals carried by the rocker frame below said fulcrum axis, a main sprocket journalled on the main frame, a driven sprocket coaxially carried by said road wheel and having a driving relation therewith, an endless chain connecting said sprockets, a pair of one-way clutches coaxially mounted on said main sprocket and adapted to form a forward driving connection therefor, a sprocket concentrically affixed to the driving part of each clutch, and a chain trained over each of these sprockets and connected to the rocker frame so as to be pulled thereby, the arrangement being such that in the oscillation of the rocker frame the forward stroke imparts a power impulse to one of the chain sprockets and the back stroke imparts a power impulse to the other chain sprocket, which impulses are communicated alternately by the clutches to the main sprocket to make unidirectional drive for the road wheel.

3. In a bicycle or exercise machine, a wheeled main frame having a road wheel and a seat, a rocker frame disposed forwardly of said seat and fulcrumed on said main frame for oscillating to and fro, a handle bar carried by the rocker frame above the fulcrum axis thereof, pedals carried by the rocker frame below said fulcrum axis, a rotary driving member mounted on the main frame and having a driving connection with the road wheel, a pair of one-way clutches coaxially mounted thereon and adapted to form a forward driving connection therefor, rotary elements carried by the driving parts of said clutches, flexible elements connected to the rocker frame at a distance from the fulcrum axis thereof and extending respectively around the said rotary elements of the clutches whereby the rocker frame exerts a pull upon the flexible elements to turn the rotary elements, the flexible elements having a fixed end and a yieldable end, and elastic means retaining the yieldable end in taut condition for taking up slack in the operation of the flexible elements, the arrangement being such that in the oscillation of the rocker frame the forward stroke imparts a power impulse to one of the rotary elements and the back stroke imparts a power impulse to the other rotary element, which impulses are communicated alternately by the clutches to the aforesaid rotary driving member to make a unidirectional drive for the road wheel.

4. A structure as set forth in claim 3, and in which the elastic means therein mentioned consist of expansile springs anchored to the rocker frame.

5. In a bicycle or exercise machine, a wheeled main frame having a road wheel and a seat, a rocker frame disposed forwardly of said seat and fulcrumed on said main frame for oscillating to and fro, a handle bar carried by the rocker frame above the fulcrum axis thereof, pedals carried by the rocker frame below said fulcrum axis, a main sprocket journalled on the main frame, a driven sprocket coaxially carried by the said road wheel and having a driving relation therewith, an endless chain connecting said sprockets, a pair of one-way clutches coaxially mounted on said main sprocket and adapted to form a forward driving connection therefor, a sprocket concentrically affixed to the driving part of each clutch, a speed increasing wheel journalled on the rocker frame at each side of the fulcrum axis thereof, a reciprocal chain trained over each of these wheels and the sprockets that are affixed to the driving part of each clutch aforesaid, the reciprocal chains having a fixed end and a yieldable end and forming a separate drive for each clutch, and elastic means retaining the yieldable end taut and serving to take up slack, the arrangement being such that in the oscillation of the rocker frame power impulses are alternately imparted to the main sprocket.

6. A structure in accordance with claim 5, and in which the fixed ends of the reciprocal chains lead off the speed increasing wheels and are anchored to the main frame.

7. A structure as defined in claim 5, and in which the elastic means for retaining an end taut of one of the reciprocal chains consist of a guide pulley over which this chain is looped, and a tension spring applying pressure thereon.

8. A structure as defined in claim 5, and in which the elastic means for retaining an end taut of one of the reciprocal chains comprise a pulley about which this chain is looped, a bracket rotatably supporting the pulley and guidably supported for lengthwise movement on the rocker frame, and an expansile coil spring applying tension on the bracket.

9. In a bicycle or exercise machine, the combination with a main frame having a dirigible front wheel and a rear wheel propelled by a transmission connected to an erectile rocker frame fulcrumed on the main frame rearwardly of said front wheel, of an extension steering device comprising an arm extending transversely from the fork of the front wheel, a rear arm swivelled on the main frame and extending transversely from a substantially vertical axis, a rod linking the free ends of said arms for parallel movement, a post journalled coextensively on the upper end of the rocker frame above the rear arm, a handle bar fixed to said post, universal joints operably carried by said rear arm and said post at the axes thereof, and an extensile connection between the universal joints to accommodate the oscillation of the rocker frame.

10. In a bicycle or exercise machine, the combination with a main frame having a dirigible front wheel and a rear wheel propelled by a transmission connected to an erectile rocker frame fulcrumed on the main frame rearwardly of said front wheel, of an extension steering device comprising an arm extending transversely from the fork of the front wheel, a rear arm swivelled on the main frame and extending transversely from a substantially vertical axis, a rod linking the free ends of said arms for parallel movement, a post journalled coextensively on the upper end of the rocker frame above the rear arm, a handle bar fixed to said post, universal joints operably carried by said rear arm and said post at the axes thereof, and a telescopic element connecting the universal joints and straddling the main frame.

GUY BOTTOS.